United States Patent Office 2,997,496
Patented Aug. 22, 1961

2,997,496
OXYALKYLATED ORGANOTIN COMPOUNDS AND PROCESS FOR THEIR PREPARATION
Christoph Dörfelt, Altötting, and Kurt Härtel and Eugen Reindl, Burgkirchen, Germany, assignors to Farbwerke Hoechst Aktiengesellschaft vormals Meister Lucius & Brüning, Frankfurt am Main, Germany, a corporation of Germany
No Drawing. Filed Dec. 27, 1956, Ser. No. 630,734
Claims priority, application Germany Dec. 31, 1955
8 Claims. (Cl. 260—429.7)

The present invention relates to the preparation of organic compounds of tin having a relatively low tin content.

There are known organic compounds of tin wherein up to four equal or different organic radicals are bound to a central tetravalent tin atom and which compounds are used for various technical applications. However, the application of these substances is limited in that they are rather expensive due to the high content of tin amounting in most cases to over 20 percent by weight.

Now, we have found that new organic compounds of tin which are poor in tin may be prepared by building up polyglycolic ethers of substituted stannic acids by reacting with ethylene oxide, propylene oxide, or hgher olefin oxides an organic compound of the tetravalent tin wherein at least one organic radical is bound via carbon directly to the tin whereas up to three valences of the tin are occupied by inorganic or organic acid radicals such as halogen, phosphate or acetate or wherein one valence is saturated by the OH group. The alkylene oxide is linked in the starting material at the places where the central tin atom is not linked directly via carbon to the organic radicals.

A large molecule prepared according to the present invention by oxyethylation of triphenyltin chloride can be represented by the following formula:

$(C_6H_5)_3Sn$—$(OCH_2$—$CH_2)_nCl$ wherein $n$ represents the numbers 1–50.

In this reaction with alkylene oxide, mixtures of compounds of high molecular weight are formed; the polyglycol chains of which have different length, wherein the number of the single members which form the chain vary between 1–50. The length of the respective chains cannot be defined. It is possible, however, to determine the total content of alkylene oxide in the respective reaction product which content results from the increase in weight of the polyoxyalkylated product.

As qualified starting materials there may be mentioned for example monobutyltin trichloride, dibuyltin dichloride, tribuyltin chloride, triphenyltin chloride, triphenyltin acetate, dibuyltin diacetate, dibuyltin-bis-(o,o-diethylphosphate), tributyl-(p-toluene-sulfamido)-tin, or triphenyltin hydroxide. For the reaction of these substances with alkylene oxides suitable catalysts are added, for example tin tetrachloride, potassium hydroxide, sodium hydroxide, potassium or sodium alcoholate, and alkylene oxide, preferably ethylene oxide, is introduced at an elevated temperature. By working under pressure the reaction is facilitated and accelerated.

The following examples serve to illustrated the invention but they are not intended to limit it thereto:

Example 1

To 40 grams of dibuyltin dichloride (39.1 percent of tin), a few drops of $SnCl_4$ are added. Into the mixture ethylene oxide is then introduced at a temperature of 160–180° C. until an increase in weight of 70 grams is obtained. The reaction product represents a viscous oil containing 14.2 percent of tin.

In spite of the relatively low content of tin the product possesses a good fungicidal effect against *Alternaria tenus* and *Botrytis cynerea*.

Example 2

To 30 grams of triphenyltin chloride (tin content 30.8 percent) a few drops of tin tetrachloride are added, ethylene oxide is then introduced at a temperature of 170–180° C. until a light brown soft wax is formed which contains 14.4 percent of tin. The product is well qualified for combating *Alternaria tenuis* and *Botrytis cynerea*.

Example 3

To 24 grams of dibutyltin diacetate (tin content 37.2 percent) 0.12 gram of powdered caustic soda is added and into the mixture ethylene oxide is then introduced at a temperature of 170–200° C. until 52 grams of ethylene oxide have been absorbed.

A dark oil is obtained containing 10.5 percent of Sn. The product displays a good fungicidal effect against *Alternaria tenuis* and *Botrytis cynerea*.

Example 4

50 grams of tributyltin chloride (tin content 36.5 percent) are mixed with a few drops of $SnCl_4$ and into the mixture ethylene oxide is introduced, while stirring, at a temperature of 170° C. until 27 grams of ethylene oxide have been absorbed. A viscous dark oil is formed having a tin content of 23.7 percent of tin.

The product possesses a very good effect against *Alternaria tenuis* and *Botrytis cynerea*.

Example 5

40 grams of triphenyltin hydroxide are mixed with 0.5 gram of $SnCl_4$ and ethylene oxide is then introduced into the mixture at a temperature of 150–200° C. until an increase in weight of 50 grams is obtained. In spite of the lowered tin content the product obtained still has a good fungicidal effect.

We claim:

1. A member selected from the group consisting of products of the formulae (A)
$$R_x'—Sn[(O—CH_2—CH_2—O—CH_2—CH_2)_nZ]_{4-x}$$

wherein R' represents a member selected from the group consisting of alkyl radicals having 1 to 6 carbon atoms and a phenyl radical, $x$ represents an integer from 1 to 3, $n$ is an integer from 1 to 25, and Z represents a member selected from the group consisting of halogen, acetate and phosphate radicals, (B)
$$R'—Sn[(O—CH_2—CH_2—O—CH_2—CH_2)_nOH]_3$$

wherein R' and $n$ having the meaning given above, and (C)
$$R_3'—Sn[(O—CH_2—CH_2—O—CH_2—CH_2)_nOH]$$

wherein R' and $n$ have the meaning given above.

2. Tributyltin-polyoxyethyl chloride of the formula:

$$(C_4H_9)_3Sn—(OCH_2—CH_2)_nCl$$

wherein $n$ corresponds to a tin content of the product of 24 percent.

3. Dibutyltin-bis[polyoxyethyl chloride] of the formula:

$$(C_4H_9)_2Sn[—(OCH_2—CH_2)_nCl]_2$$

wherein $n$ corresponds to a tin content of the product of 14 percent.

4. Dibutyltin-bis-(polyoxyethyl acetate) of the formula:

$$[(C_4H_9)_2Sn[—(OCH_2—CH_2)_n—O—\overset{O}{\underset{\|}{C}}—CH_3]_2$$

wherein $n$ corresponds to a tin content of the product of 10 percent.

5. Triphenyltin-polyoxyethyl chloride of the formula:

$$(C_6H_5)_3Sn(OCH_2-CH_2)_n-Cl$$

wherein $n$ corresponds to a tin content of the product of 14 percent.

6. Triphenyltin polyoxyethyl of the formula:

$$(C_6H_5)_3Sn-(OCH_2-CH_2)_n-OH$$

wherein $n$ corresponds to a tin content of the product of 14 percent.

7. A process for the preparation of organic compounds of tin having a low tin content, which comprises reacting compounds of the general formula:

$$R'_xSnR''(4-x)$$

wherein R' represents a member selected from the group consisting of alkyl radicals having 1 to 6 carbon atoms and a phenyl radical, $x$ represents an integer from 1 to 3 and R" represents a member selected from the group consisting of halogen, hydroxy, acetate and phosphate radicals, with 1 to 50 mols each of an alkylene oxide.

8. A process as claimed in claim 7 which comprises using as alkylene oxide a member selected from the group consisting of ethylene oxide, propylene oxide and mixtures of ethylene oxide and propylene oxide.

References Cited in the file of this patent

UNITED STATES PATENTS

| | | |
|---|---|---|
| 2,310,449 | Lightbrown et al. | Feb. 9, 1943 |
| 2,349,771 | Horst | May 23, 1944 |
| 2,789,103 | Weinberg et al. | Apr. 16, 1957 |
| 2,789,994 | Ramsden et al. | Apr. 23, 1957 |
| 2,790,785 | Ramsden et al. | Apr. 30, 1957 |
| 2,858,325 | Weinberg | Oct. 28, 1958 |
| 2,901,393 | Magner | Aug. 25, 1959 |

OTHER REFERENCES

Gilman et al.: "J. Org. Chem.," 15, 994–1002 #5 (1950).